United States Patent [19]
Knight

[11] 3,800,877
[45] Apr. 2, 1974

[54] PROCESS OF FLOODING OIL-BEARING FORMATIONS USING ALDEHYDES AS OXYGEN SCAVENGERS IN POLYMER SOLUTIONS

[75] Inventor: Bruce L. Knight, Littleton, Colo.

[73] Assignee: Marathon Oil Company, Findlay, Ohio

[22] Filed: Aug. 28, 1972

[21] Appl. No.: 284,204

Related U.S. Application Data

[63] Continuation-in-part of Ser. No. 191,558, Oct. 21, 1971, abandoned, which is a continuation-in-part of Ser. No. 117,692, Feb. 22, 1971, abandoned.

[52] U.S. Cl............ 166/305 R, 166/273, 166/274
[51] Int. Cl............................................. E21b 43/22
[58] Field of Search........................... 166/273–275, 166/305 R; 252/8.55 D

[56] References Cited
UNITED STATES PATENTS

| | | | |
|---|---|---|---|
| 2,827,964 | 3/1958 | Sandiford et al. | 166/274 |
| 3,053,765 | 9/1962 | Sparks | 252/8.55 D |
| 3,580,337 | 5/1971 | Gogarty et al. | 166/273 |
| 3,085,063 | 4/1963 | Turbak | 252/8.55 D |
| 3,106,525 | 10/1963 | Schmid et al. | 252/8.55 D |
| 3,625,888 | 12/1971 | Redmore et al. | 252/8.55 D |
| 3,634,232 | 1/1972 | Dunlop | 252/8.55 D X |

*Primary Examiner*—Stephen J. Novasad
*Attorney, Agent, or Firm*—Joe C. Herring; Richard C. Willson, Jr.; Jack L. Hummel

[57] ABSTRACT

Flooding of oil-bearing subterranean formations with aqueous solutions of partially hydrolyzed, high molecular weight polyacrylamides or copolymers of acrylamide and acrylic acid wherein the aqueous solution contains at least 0.1 ppm of dissolved oxygen and the oxygen adversely influences the mobility imparted by the polymer, is improved by incorporating 5-1000 ppm of a water-soluble aldehyde (preferably formaldehyde) into the aqueous solution to form a complex with the oxygen and thereby inhibit the adverse effects of the oxygen.

18 Claims, No Drawings

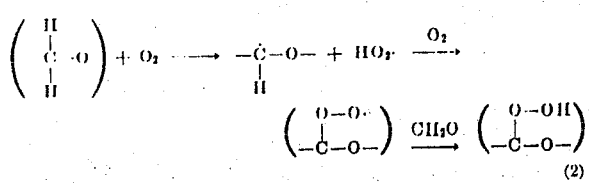

The above reactions take place at ambient temperature or reservoir temperature. Of course, other aldehydes can be substituted for the formaldehyde or paraformaldehyde in the above reactions.

Concentrations of about 5 to about 1,000 ppm and preferably about 25 to about 750 ppm and more preferably about 50 to about 500 ppm of the aldehyde are useful within the aqueous polymer solution. Of course, an increase oxygen concentration within the aqueous polymer solution will generally demand a larger concentration of aldehyde within the solution. The aldehyde can be in concentrations of at least greater than the stoichiometric amount needed to react with the available oxygen within the aqueous system. Generally speaking, about 50 to about 200 ppm of formaldehyde in the aqueous polymer solution is useful to inhibit oxygen degradation in most reservoirs. In addition, sufficient aldehyde may be incorporated within the aqueous polymer solution to act as a bactericide. However, the above concentration ranges are generally effective to take care of the available oxygen as well as the bacteria. The formaldehyde can be introduced into the system as an aqueous solution of formaldehyde, e.g., 27-40 percent concentration.

The minimum concentration of dissolved oxygen in the water that adversely influences mobility control of aqueous polymer solutions is above about 0.1 and generally above about 0.5 ppm. Concentrations above 1.0 ppm and up to 8–10 or more ppm are generally characteristic of aqueous polymer solutions. Of course the upper limits of oxygen concentration in the water will depend on temperature, viscosity, etc. The degree of adversity is directly dependent on the oxygen concentration.

The polymers applicable with this invention include partially hydrolyzed high molecular weight polyacrylamides, copolymers of acrylamide and acrylic acid or alkali metal salts thereof, and partially hydrolyzed products of these copolymers. Specific examples of the partially hydrolyzed polyacrlamides are found in U. S. Pat. Nos. 2,827,964 to Sandiford; 3,039,529 to McKinnon; and 3,282,337 to Pye. Examples of preferred copolymers include those of acrylamide and sodium acrylate and partially hydrolyzed products thereof. Preferably the polymers have average molecular weights above one million and more preferably above 5–10 million.

EXAMPLES

The following examples are presented to teach specific embodiments of the invention. The percents are based on volume, unless otherwise specified. Also, viscosities are measured at ambient temperature. The "screen factor" used in the examples is determined by the method taught in SPE Paper 2867, titled "Factors Influencing Mobility Control by Polymer Solution," Jennings et al., copyright 1970—the screen factor is a measure of the time a given volume of polymer solution flows through a porous medium (usually a pack of five 100-mesh stainless steel screen in close contact) compared to the flow time for the same volume of water through the same medium. The "screen factor" correlates flow resistance in a porous medium for a given polymer class because it is sensitive to changes in molecular weight and structure, the latter factors are of great importance in mobility control.

EXAMPLE I

Three samples are obtained by mixing 700 ppm of Dow 700 series Pusher polymer (a partially hydrolyzed, high molecular weight polyacrylamide marketed by S.O.R.D., Dow Chemical Co., Midland, Mich.) with water containing about 555 ppm of total dissolved solids, analyzed as:

| Component | PPM |
|---|---|
| Na+ | 135 |
| Ca+ | 20 |
| Cl– | 70 |
| HCO$_3$– | 215 |
| SO$_4$= | 115 |
| Total | 555 |

The water is filtered through a 0.1 micron filter to inhibit bacteria formation, but is not de-oxygenated.

The samples are prepared in a pure nitrogen atmosphere at 23°C and are stored at 50°C in dark bottles in a pure nitrogen atmosphere. The screen factors and viscosities of the samples are periodically measured at 23°C to determine the degradation of the solutions due to dissolved oxygen (concentration about 9–10 ppm before the hyposulfite or formaldehyde is added) within the water. Sample 1 contains no additives and serves as a blank for comparative purposes. Sample 2 contains 50 ppm of sodium hyposulfite. Sample 3 contains 200 ppm of an equilibrium mixture of formaldehyde and paraformaldehyde. The screen factors and viscosities are measured periodically until stability of the readings is observed. Also, the preparation and storage of the samples are carried out in such a manner as to preclude the possibility of bacterial degradation. Hence, all observed degradation is assumed to be due to the presence of oxygen. Table 1 indicates the screen factors and viscosities of the three samples over the indicated times:

TABLE 1

Sample 1: No additives

| Time, Days | Screen Factor | Viscosity, cp | |
|---|---|---|---|
| 0 | 24.3 | 32.4 | |
| 2 | 22.5 | 32.3 | |
| 5 | 21.4 | 31.4 | |
| 8 | 20.7 | 31.6 | |
| 16 | 18.2 | 30.5 | Screen |
| 26 | 16.8 | 30.2 | Factor Loss = 32% |
| 33 | 18.4 | 30.7 | Viscosity Loss = 8% |
| 47 | 17.2 | 30.2 | |
| 65 | 16.6 | 29.7 | |

Sample 2: 50 ppm Sodium Hyposulfite

| Time, Days | Screen Factor | Viscosity, cp | |
|---|---|---|---|
| 0 | 24.4 | 29.6 | |
| 2 | 23.0 | 29.4 | |
| 5 | 23.2 | 29.4 | Screen |
| 8 | 23.3 | 29.8 | Factor Loss = 4% |
| 16 | 23.1 | 29.4 | Viscosity Loss = 0 |
| 26 | 23.3 | 29.6 | |
| 33 | 23.3 | 29.6 | |

Sample 3: 200 ppm Formaldehyde

| Time, Days | Screen Factor | Viscosity, cp | |
|---|---|---|---|
| 0 | 26.0 | 30.8 | |
| 3 | 25.0 | 31.0 | Screen |
| 14 | 25.3 | 31.0 | Factor Loss = 5% |
| 28 | 24.9 | 30.6 | Viscosity Loss = 0.6% |
| 34 | 24.8 | 30.6 | |

Regarding Sample 1, the total screen factor loss is 32 percent and the total viscosity loss is 8 percent. Regarding sample 2, i.e., containing 50 ppm of sodium hyposulfite, the total screen factor loss is 4 percent and the viscosity loss is 0 percent. With sample 3, the total screen factor loss is 5 percent whereas the viscosity loss

PROCESS OF FLOODING OIL-BEARING FORMATIONS USING ALDEHYDES AS OXYGEN SCAVENGERS IN POLYMER SOLUTIONS

CROSS REFERENCE TO RELATED APPLICATIONS

This is a continuation-in-part of my copending application, Ser. No. 191,558, filed Oct. 21, 1971 now abandoned, which is a continuation-in-part of Ser. No. 117,692, filed Feb. 22, 1971, also now abandoned.

1. Field of the Invention.

This invention relates to flooding oil-bearing subterranean formations with aqueous polymer solutions containing dissolved oxygen. A water-soluble aldehyde, e.g., formaldehyde is admixed with the solution to complex with the oxygen and inhibit the adverse effect of the oxygen upon the polymer flood.

2. Description of the Prior Art.

It is known in the art that formaldehyde will react with polyacrylamde as taught in "Water-Soluble Resins," edited by Robert L. Davidson and Marshall Sittig, Reinhold Book Corporation, copyright 1962, page 180. This article teaches that the polyacrylamide reacts with formaldehyde to form methylolated polyacrylamide.

U.S. Pat. No. 3,085,062 to Turbak teaches that 0.005–5 percent of formalydehye is useful to reduce viscosity loss, due to thermal degradation, during viscous waterflooding with viscosity-imparting agents such as sulfonated polymers, copolymerized products of vinyl aromatics and maleic anhydrides, and synthetic polymers containing an aromatic ring, polyethylene oxide type or polypropylene oxide type.

U. S. Pat. No. 2,827,964 to Sandiford teaches the use of aldehydes as bactericides in aqueous solutions containing partially hydrolyzed, high molecular weight polyacrylamides. Such give improved oil recoveries.

U. S. Pat. No. 3,042,611 to Patton teaches improved waterflooding by incorporating formaldehyde into an aqueous dextran solution. Patton mentions the formaldehyde has a bactericidal effect as well as a pronounced stabilizing chemical effect at reservoir temperatures and even in the presence of rock surfaces, ions, etc.

U. S. Pat. No. 2,702,791 to Teichmann teaches the use of formaldehyde to inhibit the deterioration of a tannin dispersant in drilling fluids, Teichmann mentions that the deteriortion is due to oxygen within the drilling muds.

Partially hydrolyzed polyacrylamides and copolymers of acrylamide and acrylic acid or the alkali salts thereof have gained acceptance as very useful mobility reducing agents in secondary and tertiary oil recovery processes. The polymers reduce the mobility of the waterflood by reducing the relative permeability to the flow of water in the reservoir rock as well as increasing the viscosity of the water. Certain factors within the reservoir, however, tend to adversely affect the mobility reducing characteristics of the polymer solutions. The most common forms of degradation are bacterial action and oxygen-initiated free radical formation.

Sodium hyposulfite is used to overcome oxygen degradation; however, there must be a catalyst present, e.g., salts of cobalt, copper, and nickel, to catalyze the reaction of hyposulfite with the oxygen. The catalyst can be present in the water; but, where not present, the catalyst has to be added to effectively remove the oxygen.

Applicant has discovered that by incorporating water-soluble aldehydes, such as formaldehyde, within the aqueous system, the adverse effects of the oxygen can be overcome and improved mobility control is realized.

SUMMARY OF THE INVENTION

Applicant has discovered a process of improving mobility control of aqueous solutions containing dissolved oxygen and partially hydrolyzed, high molecular weight polyacrylamides, copolymers of acrylamide and acrylic acid or alkali metal salts thereof, and partially hydrolyzed products of the copolymers. Oxygen dissolved in the aqueous solution at concentrations above 0.1 ppm adversely influences the mobility control—applicant has overcome this adversity by incorporating formaldehyde into the aqueous solution to complex with the oxygen. Concentrations of about 5 to 1,000 ppm of formaldehyde are useful in the aqueous solution.

PREFERRED EMBODIMENTS OF THE INVENTION

This invention is especially useful with secondary and tertiary recovery methods wherein a displacing fluid is used to displace crude oil from a subterranean oil-bearing reservoir. The displacing fluid can be an immiscible displacing fluid, a miscible or miscible-like displacing fluid followed by an aqueous solution containing a mobility reducing agent and this, in turn, optionally followed by a drive fluid. An example of an immiscible flood includes an aqueous waterflood having a mobility reducing agent incorporated into a portion thereof to impart mobility control to the process. Examples of miscible and miscible-like flooding processes include injecting a first displacing fluid, e.g., an emulsion, a micellar dispersion, an oil-miscible fluid, soluble oil, etc. and this in turn followed by an aqueous slug containing a mobility reducing agent. Examples of useful displacing fluids include those defined in U. S. Pat. Nos. 3,254,714 and 3,275,075 to Gogarty et al.; 3,497,006 to Jones et al.; 3,506,070 to Jones; 3,330,344, 3,330,348, and 3,330,611 to Reisberg; 3,537,520 to Holm, etc.

The water-soluble aldehydes include those aldehydes containing 1 to about 5 carbon atoms and which are water-soluble Preferably, the aldehyde is either paraformaldehyde or formaldehyde or an equilibrium mixture thereof. The aldehyde complexes with the oxygen within the aqueous solvent and prevents degradation of the mobility control agent due to the oxygen. It is postulated that this beneficial effect is due to the formation of a stable radical species upon reaction with oxygen; such is illustrated by the following formulae (Formula 1 is with formaldehyde and Formula 2 is with performaldehyde):

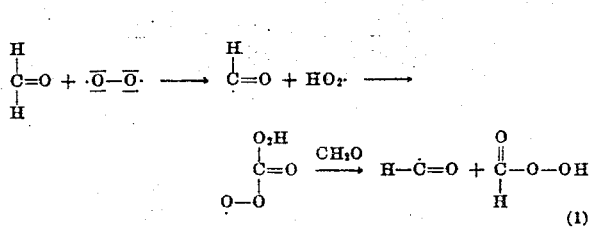

is about 0.6 percent. The above data indicate the effectiveness of formaldehyde as an oxygen scavenger.

EXAMPLE II

For a comparative study, treatment of identical wells in a reservoir is performed. The same source of injection water is used throughout the testing and concentration of Dow 700 Pusher polymer throughout the testing is 335 ppm. Also, the procedure for injecting the water, etc., is consistent in both tests. The chemicals are admixed with the water in a pipeline at a distance of about one-half mile from the wellhead. The aqueous polyacrylamide solution, absent dissolved oxygen, has a screen factor of 15.6 and a viscocity of 9.5 cp. Oxygen is "taken up" or sorbed by the water as it travels to the wellhead. Oxygen concentration at the wellhead is about 10 ppm, i.e., this is the equivalent oxygen concentration before reaction with formaldehyde or hyposulfite. The data illustrated in Table 2 for the "First Test" and "Second Test" are obtained at the wellhead.

First Test

The water is treated with 50 ppm of sodium hyposulfite and 25 ppm of sodium pentachlorophenol, a bactericide, prior to addition of polymer. The results of this test are indicated in Table 2.

Second Test

The above treatment was stopped, and sufficient time was allowed for the system to purge itself. Thereafter, the water was treated with 200 ppm of an aqueous formaldehyde solution containing 37 percent active formaldehyde, thus 74 ppm of formaldehyde, prior to addition of polymer. The results of this treatment are indicated in Table 2.

TABLE 2

| | Screen Factor | Viscosity, cp |
|---|---|---|
| Aqueous polyacrylamide solution absent dissolved oxygen | 15.6 | 9.5 |
| First Test: After sodium hyposulfite + sodium pentachlorophenol | 5.2 | 5.5 |
| Second Test: After formaldehyde | 13.2 | 6.7 |

From the above data it is evident that the formaldehyde treatment in Test 2 gives better screen factors and retains the viscosity better than does the sodium hyposulfite plus the bactericide used in Test 1.

Formaldehyde can also be added to polymer solution after degradation starts as a result of contact with oxygen; in such a case, degradation essentially ceased upon addition of the aldehyde. Addition of hyposulfite in a similar situation does not result in any such beneficial effect.

EXAMPLE III

The procedure of Example I is repeated except the polymer solutions are stored at 22° C and the polymer is a copolymer obtained by a catalyzed aqueous reaction of 70 percent acrylamide and 30 percent sodium acrylate; average molecular weight is about 12-15 million. Oxygen concentration is about 8-10 ppm and polymer concentration is 700 ppm. Results are shown in Table 3.

TABLE 3

With 50 ppm of formaldehyde

| Time, Days | Screen Factor | Viscosity, cp (6RPM, 72° F) |
|---|---|---|
| 0 | 25.4 | 39.6 |
| 6 | 26.5 | 38.4 |
| 11 | 26.1 | 38.7 |
| 26 | 24.5 | 37.9 |
| 46 | 25.5 | 38.1 |
| 67 | 26.2 | 38.7 |
| 85 | 25.2 | 37.6 |
| 127 | 25.2 | 37.4 |

No formaldehyde present

| Time, Days | Screen Factor | Viscosity, cp (6RPM, 72° F) |
|---|---|---|
| 0 | 27.3 | 39.1 |
| 4 | 27.4 | 38.7 |
| 19 | 25.2 | 38.7 |
| 39 | 24.1 | 35.8 |
| 61 | 22.6 | 34.1 |
| 83 | 20.1 | 33.0 |
| 123 | 18.9 | 32.1 |

The above data clearly shows that the properties of the copolymer are improved with formaldehyde.

It is not intended that this application be limited by the specifies taught herein. Rather, all equivalents obvious to those skilled in the art are intended to be incorporated within the scope of the invention as defined within the specification and appended claims.

What is claimed is:

1. A process of improving the mobility control of flooding an oil-bearing subterranean formation wherein an aqueous solution comprised of polymer(s) selected from the group consisting of partially hydrolyzed, high molecular weight polyacrylamides, copolymer of acrylamide and acrylic acid or alkali metal salts thereof, and partially hydrolyzed polymers of the copolymers is injected into the formation to improve the mobility control thereof and wherein the water contains at least about 0.1 ppm (based on the water) of dissolved oxygen which adversely affects the mobility control through degradation of the polymer, the improvement comprising incorporating into the aqueous solution sufficient amounts of aldehyde to complex with the oxygen and thus inhibit the adverse effect the oxygen has upon degrading the aqueous polymer solution.

2. The process of claim 1 wherein about 5 to about 1,000 ppm of formaldehyde is incorporated into the aqueous solution.

3. The process of claim 1 wherein about 25 to about 750 ppm of formaldehyde is incorporated into the aqueous solution.

4. The process of claim 1 wherein about 50 to about 500 ppm of formaldehyde is incorporated into the aqueous solution.

5. The process of claim 1 wherein the polymer has an average molceular weight of at least about one million.

6. The process of claim 1 wherein a slug of micellar dispersion is injected into the formation Previous to the injection of the polymer solution.

7. The process of claim 1 wherein the dissolved oxygen concentration in the water is at least about 1.0 ppm.

8. The process of claim 1 wherein the polymer is a partially hydrolyzed, high molecular weight polyacrylamide.

9. The process of claim 1 wherein the polymer is a copolymer of acrylamide and sodium acrylate.

10. A process of improving the mobility of control of flooding an oil-bearing subterranean formation wherein an aqueous solution comprised of a partially hydrolyzed, high molecular weight polyacrylamide is injected into the formation and displaced therethrough to improve the mobility control of the flooding process and wherein the water contains at least about 0.1 ppm (based on the water) of dissolved oxygen which adversely affects mobility control through degradation of the polyacrylamide, the improvement comprising incorporating into the aqueous solution about 5 to about 1,000 ppm of a water-soluble aldehyde to complex with the oxygen and thus inhibit the adverse influence the oxygen has upon degrading the aqueous polyacrylamide solution.

11. The process of claim 10 wherein the aldehyde is formaldehyde.

12. The process of claim 10 the aldehyde is an equilibrium mixture of formaldehyde and paraformaldehyde.

13. The process of claim 10 wherein the concentration of the aldehyde is about 25 to about 750 ppm, based on the aqueous solution.

14. The process of claim 10 wherein the concentration of the aldehyde is about 50 to about 500 ppm, based on the aqueous solution.

15. A process of improving the mobility control of flooding an oil-bearing subterranean formation wherein an aqueous solution comprised of a copolymer of acrylamide and acrylic acid or an alkali metal salt thereof is injected into the formation and displaced therethrough to improve the mobility control of the flooding process and wherein the water contains at least about 0.1 ppm (based on the water) of dissolved oxygen which adversely affects mobility control through degradation of the copolymer, the improvement comprising incorporating into the aqueous solution about 5 to about 1,000 ppm of a water-soluble aldehyde to complex with the oxygen and thus inhibit the adverse influence the oxygen has upon degrading the aqueous copolymer solution.

16. The process of claim 15 wherein the aldehyde is formaldehyde.

17. The process of claim 15 wherein the aldehyde is an equilibrium mixture of formaldehyde and paraformaldehyde.

18. The process of claim 15 wherein the concentration of the aldehyde is about 50 to about 500 ppm, based on the aqueous solution.

* * * * *

UNITED STATES PATENT OFFICE
CERTIFICATE OF CORRECTION

Patent No. 3,800,877　　　　　　　　Dated April 2, 1974

Inventor(s) Bruce L. Knight

It is certified that error appears in the above-identified patent and that said Letters Patent are hereby corrected as shown below:

Column 2, line 57:　　　　Delete "performaldehyde" and insert --paraformaldehyde--.

Column 6, line 17:　　　　Delete "specifies" and insert --specifics--.

Column 6, line 51:　　　　Delete "Previous" and insert --previous--.

Column 7, line 11:　　　　After "10" insert --wherein--.

Signed and sealed this 30th day of July 1974.

(SEAL)
Attest:

McCOY M. GIBSON, JR.　　　　　　　　C. MARSHALL DANN
Attesting Officer　　　　　　　　　　Commissioner of Patents